United States Patent
De Carney

(10) Patent No.: US 9,924,012 B2
(45) Date of Patent: Mar. 20, 2018

(54) APPARATUS FOR ANSWERING A PHONE CALL WHEN A RECIPIENT OF THE PHONE CALL DECIDES THAT IT IS INAPPROPRIATE TO TALK, AND RELATED METHOD

(71) Applicant: SARONIKOS TRADING AND SERVICES, UNIPESSOAL LDA, Funchal, Madeira (PT)

(72) Inventor: Carolina T. De Carney, Panama (PA)

(73) Assignee: SARONIKOS TRADING AND SERVICES, UNIPESSOAL LDA, Funchal, Madeira (PT)

( * ) Notice: Subject to any disclaimer, the term of this patent is extended or adjusted under 35 U.S.C. 154(b) by 0 days.

(21) Appl. No.: 14/787,539

(22) PCT Filed: May 2, 2013

(86) PCT No.: PCT/EP2013/059083
§ 371 (c)(1),
(2) Date: Oct. 28, 2015

(87) PCT Pub. No.: WO2014/177209
PCT Pub. Date: Nov. 6, 2014

(65) Prior Publication Data
US 2016/0065711 A1    Mar. 3, 2016

(51) Int. Cl.
*H04M 1/64*    (2006.01)
*H04M 1/725*    (2006.01)
(Continued)

(52) U.S. Cl.
CPC .......... *H04M 1/645* (2013.01); *G06F 17/276* (2013.01); *G06F 17/279* (2013.01); *G10L 15/18* (2013.01);
(Continued)

(58) Field of Classification Search
CPC ...................................................... H04M 1/645
(Continued)

(56) References Cited

U.S. PATENT DOCUMENTS

| 7,106,852 B1 | 9/2006 | Nelson et al. |
| 2001/0043144 A1* | 11/2001 | Morris ................... G08B 7/066 340/692 |

(Continued)

FOREIGN PATENT DOCUMENTS

| EP | 0 249 575 | 12/1987 |
| EP | 1 465 393 | 10/2004 |

(Continued)

OTHER PUBLICATIONS

International Search Report for Application No. PCT/EP2013/059083 dated Jan. 28, 2014.
(Continued)

*Primary Examiner* — Shahriar Behnamian
(74) *Attorney, Agent, or Firm* — Workman Nydegger

(57) ABSTRACT

An apparatus for answering a phone call when a recipient of the phone call decides that it is inappropriate to talk, the apparatus including control means for sending a dedicated command, opening a voice conversation with a caller, putting the apparatus in a message mode and so answering the phone call, and typing a text message; a microphone that is muted after sending the dedicated command for the whole period that the apparatus is in the message mode; an earphone device for listening to the caller; a text-to-speech injection apparatus including a text-to-speech translation apparatus and a database of words for synthesizing the text message into a speech message and transmitting the speech message to the caller during the voice conversation; and a voice-message injection module for sending an alert voice message to the caller saying that the recipient is not talking, but is substituted by the text-to-speech injection apparatus.

17 Claims, 2 Drawing Sheets

(51) Int. Cl.
| | |
|---|---|
| *G06F 17/27* | (2006.01) |
| *G10L 15/18* | (2013.01) |
| *H04W 4/12* | (2009.01) |
| *G10L 15/26* | (2006.01) |
| *H04M 1/663* | (2006.01) |
| *G10L 13/00* | (2006.01) |
| *H04W 88/06* | (2009.01) |

(52) U.S. Cl.
CPC ......... *H04M 1/642* (2013.01); *H04M 1/7255* (2013.01); *H04M 1/72519* (2013.01); *H04W 4/12* (2013.01); *G10L 13/00* (2013.01); *G10L 15/1822* (2013.01); *G10L 15/26* (2013.01); *H04M 1/663* (2013.01); *H04W 88/06* (2013.01)

(58) Field of Classification Search
USPC ....................................................... 455/412.1
See application file for complete search history.

(56) References Cited

U.S. PATENT DOCUMENTS

2003/0228002 A1* 12/2003 Tucker ................ H04M 1/6505
379/88.01
2004/0165924 A1* 8/2004 Griffin .................. G06F 1/1626
400/486

FOREIGN PATENT DOCUMENTS

| EP | 2536176 A1 * | 12/2012 | .............. H04W 4/18 |
|---|---|---|---|
| GB | 2 402 650 | 12/2004 | |
| GB | 2 408 170 | 5/2005 | |
| JP | S63-54855 | 3/1988 | |
| JP | H07-74843 | 3/1995 | |
| JP | 2000-134298 | 5/2000 | |
| JP | 2004-129174 | 4/2004 | |
| JP | 2008-072425 | 3/2008 | |
| JP | 3165585 | 1/2011 | |

OTHER PUBLICATIONS

Japanese Office Action for corresponding application No. 2016-510947 dated Dec. 20, 2016.
Yumi Ichimura et al, "*Kana-Kanji Conversion System with Input Prediction Function*", Journal of IEICE, IEICE, Dec. 1, 2012, vol. J85-D-II, No. 12, p. 1853-1863 (Document showing a well-known technique).
Chinese Search Report dated Jan. 19, 2017, issued in Chinese Application No. 2013800761754, filed May 2, 2013.
Chinese Office Action dated Jan. 25, 2017, issued in Chinese Application No. 201380076175.4.

* cited by examiner

APPARATUS FOR ANSWERING A PHONE CALL WHEN A RECIPIENT OF THE PHONE CALL DECIDES THAT IT IS INAPPROPRIATE TO TALK, AND RELATED METHOD

The present application claims priority from PCT Patent Application No. PCT/EP2013/059083 filed on May 2, 2013, the disclosure of which is incorporated herein by reference in its entirety.

FIELD OF THE INVENTION

The present invention relates to an apparatus for answering a phone call when a recipient of the phone call decides that it is inappropriate to talk, as well as the related method.

It is known that a recipient of the phone call may decide that it is inappropriate to talk in order to answer an incoming call.

Said situation may arise from the actual location of the recipient, for example when he/she is using a means of public transport where he/she wishes to maintain confidential the content of the call, or in a business meeting or conference where it is inappropriate to start a telephone conversation, even if the subject matter of the call is important or urgent.

Another situation, where it is practically impossible to talk and therefore answering a phone call, takes place when the recipient is located in a place with a lot of noise (such as a sports stadium) and even shouting into the microphone of the apparatus it is not enough for the caller to distinguish what the recipient is saying in respect to noise that is surrounding him or her.

Normally when the recipient of a phone call is in one of the above said situations, he/she prefers not to answer the incoming phone call and starts messaging the caller using one of the facilities of the phone set, for instance the SMS facility.

However answering a phone call in this way means losing the benefits associated with a voice call, due to the fact that first of all the user has to exit from the phone call and also compel the caller to use the same messaging facility. Moreover all known systems of text messaging require a given amount of time to input the words and the immediacy of a telephone conversation with questions and immediate response is lost. This becomes more evident in connection to the fact that in order to send an SMS it is necessary to finish the entire phrase or message before sending it.

SUMMARY OF THE INVENTION

It is therefore one object of the present invention to provide an apparatus and a method for answering a phone call when a recipient of the phone call decides that it is inappropriate to talk, that overcomes the drawbacks of the prior art.

It is another object of the present invention to provide an apparatus and a method for helping the recipient of a phone call answer a call without talking, but by inputting data in the apparatus in a very rapid manner.

It is a further object of the present invention to provide an apparatus and a method for substituting the voice of the recipient of a phone call, when he/she decides that is inappropriate to talk, with something that is as similar as possible to a normal conversation when the recipient of a phone call answers talking with the caller.

These and other objects of the invention are achieved through an apparatus and a method for answering a phone call when a recipient of the phone call decides that it is inappropriate to talk, as claimed in the appended claims, which are an integral part of the present description.

In short, an apparatus and a method are described for answering a phone call when a recipient of the phone call decides that it is inappropriate to talk, the apparatus comprising control means, in particular a key, for sending a dedicated command, opening a voice conversation with a caller, putting the apparatus in a message mode and thus answering the phone call; a microphone that is muted after sending the dedicated command for the entire period during which the apparatus is kept in the message mode; the control means, in particular a keyboard, are adapted to type a text message by the recipient of the apparatus; an earphone device for listening to the caller; a text-to-speech injection apparatus comprising a text-to-speech translation apparatus and a database of words for synthesizing the text message into a speech message and transmitting the speech message to the caller during the voice conversation; and a voice message injection module for sending an alert voice message to the caller, the alert voice message saying that the recipient is not talking, but is substituted by the text-to-speech injection apparatus.

Further features of the invention are set out in the appended claims, which are intended to be an integral part of the present description.

The above objects will become more apparent from the following detailed description of an apparatus and a method for answering a phone call when a recipient of the phone call decides that it is inappropriate to talk, according to the present invention, with particular reference to the annexed drawings, wherein:

DETAILED DESCRIPTION OF EMBODIMENTS

It is to be understood that the FIGS. and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
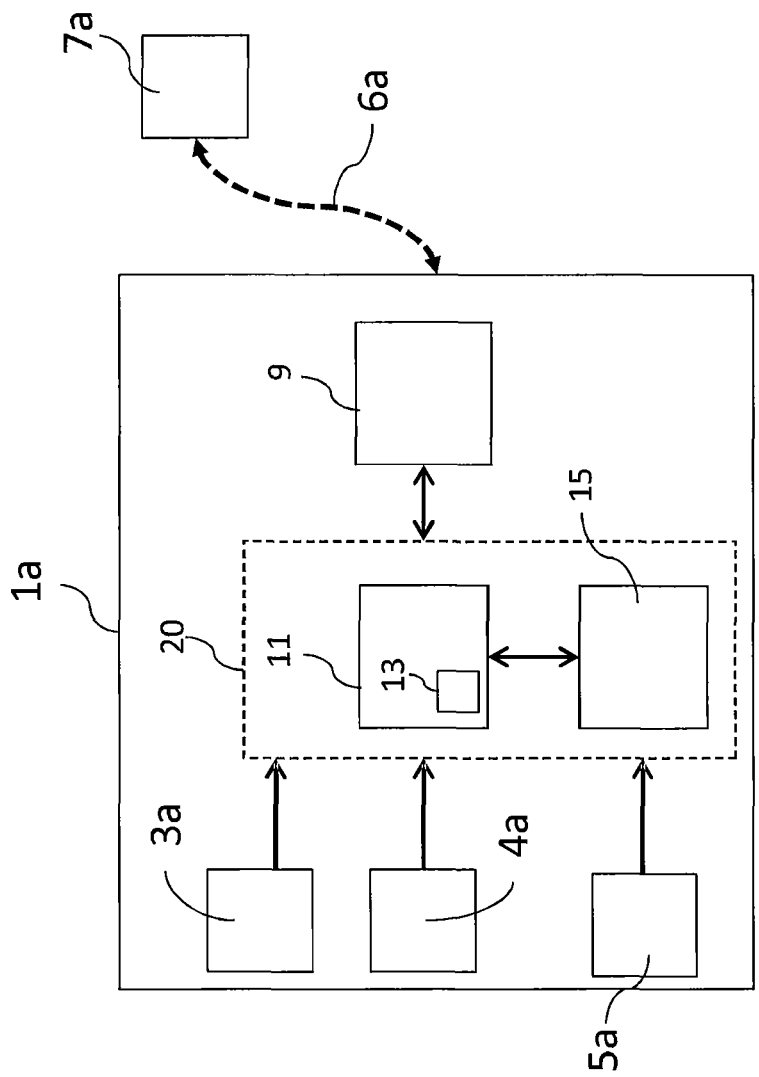
FIG. 1 shows an apparatus according to the present invention.

With reference to FIG. 1, it is shown a part of a first apparatus 1a according to the present invention, such first apparatus 1a can be a smartphone, a traditional mobile phone, a tablet and the like.

The first apparatus 1a comprises first control means, in particular a first dedicated key 3a and a first keyboard 4a. The first apparatus 1a also comprises a first microphone 5a. It is clear that said dedicated key 3a and said first keyboard 4a can be a part of a modern touch screen device, generally provided in a smartphone. The first dedicated key 3a allows a user to send a dedicated command for putting the first apparatus 1a in a "message mode" and, substantially at the same time, answering an incoming phone call opening a voice conversation with a caller. The first dedicated key 3a also produces the muting of signals coming from the microphone 5a of the first apparatus 1a for the whole period during which the first apparatus 1a is kept in such "message mode".

The function described above, namely the "message mode", can also be enabled by an opening key of a phone call (for example the conventional green key to answer an incoming call), however in this case the first apparatus 1a must be previously set in a silent/vibration mode. Then, to disable the "message mode", the recipient can press the first dedicated key 3a or exit from the silent/vibration mode.

If the first apparatus 1a is not in the silent/vibration mode and the recipient presses the opening key to open the incoming call, then the first apparatus 1a establishes a normal voice communication between caller and recipient. Therefore the first apparatus 1a is configured in such a way that the first dedicated key 3a and the opening key of an incoming call operate different functions depending on the current mode thereof (silent/vibration mode or not).

It is clear that this "message mode" function and carrying out said function help the recipient of a phone call to immediately answer without talking, only sending a command to the first apparatus 1a, in particular pressing the first dedicated key 3a or the opening key (for example the conventional green key) when the apparatus 1a is in the silent/vibration mode.

Once the recipient has summoned the "message mode", the first apparatus 1a allows the recipient to send text messages to the caller via a telecommunications network. The result is the recipient can send and input data in the first apparatus 1a in a very rapid manner.

The first keyboard 4a is useful for typing a text message by the recipient. The first keyboard 4a can be a soft or hard keyboard. Soft keyboard means that the first apparatus 1a comprises a screen (not shown in FIG. 1) allowing the display of keys of the keyboard. Hard keyboard means that the keyboard comprises physical keys.

The first apparatus 1a also comprises a first earphone device 7a that can be internal or external to the first apparatus 1a. In FIG. 1 it is shown the first earphone device 7a external to the first apparatus 1a, but it represents only one non-limiting embodiment thereof. In this case the first earphone device 7a is connected to the first apparatus 1a through a first wireless or cable connection 6a.

Referring again to FIG. 1, the first apparatus 1a comprises a text-to-speech injection apparatus 20 and a voice message injection module 9. This one is connected (not being shown in FIG. 1 for the sake of simplicity) to the rest of the apparatus (a smartphone, a traditional mobile phone, a tablet and the like) for sending voice answers, as the voice would arrive from the microphone 5a.

The text-to-speech injection apparatus 20 comprises a text-to-speech translation apparatus 11, which comprises a database 13. Moreover, the text-to-speech injection apparatus 20 comprises a speech recognition and understanding apparatus 15.

Figure 2:
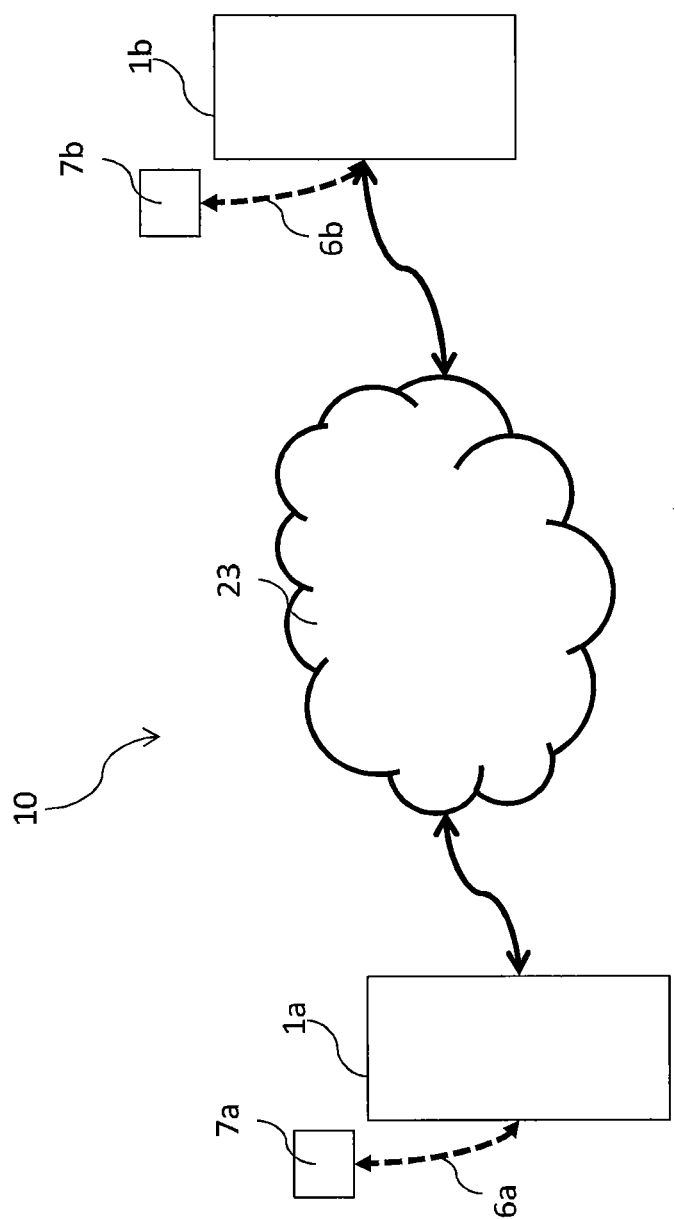
FIG. 2 shows a scenario according to the present invention.

With reference to FIG. 2, a scenario is shown 10 useful for explaining the present invention. The scenario 10 comprises the first apparatus 1a as described above and a second apparatus 1b. It is assumed that a first user of the first apparatus 1a is a recipient of a phone call and a second user of the second apparatus 1b is a caller of the phone call. The first apparatus 1a and the second apparatus 1b are in communication via a telecommunication network 23.

The second apparatus 1b is similar to the first apparatus 1a, indeed the second apparatus 1b may also comprise second control means, in particular a second dedicated key 3b, a second keyboard 4b. It also comprises a second microphone 5b and a second earphone device 7b. Similarly, the second earphone device 7b can be connected to the second apparatus 1b through a second wireless or cable connection 6b.

The text-to-speech translation apparatus 11 is responsible for capturing a text message and for transforming or translating this text message, sent from a user, for example from the recipient through the first apparatus 1a, into a speech message.

The database 13 contains a vocabulary useful for the translation, in particular it allows an association between text strings, i.e. words or phrases, and speech signals. Each text string is associated with a speech signal. The speech signal represents the message or a part thereof.

The text-to-speech injection apparatus 20 is associated to a voice/text conversation, established on a channel through the telecommunication network 23, between the recipient of the first apparatus 1a and the caller of the second apparatus 1b.

In addition to that described herein above, when the recipient activates the "message mode", he/she automatically sends, through the voice message injection module 9, an alert voice message (memorized into the apparatus 1a) to the caller, in particular a message saying that the recipient is not talking, but it is substituted by a text-to-speech injection apparatus 20.

Then, the recipient can write a text message using a keyboard 4a of the first apparatus 1a in reply to the questions posed by the caller.

Said text message is synthesized into a speech message and transmitted to the caller via the telecommunication network 23, through the remaining part of the apparatus 1a.

The voice message injection module 9 also analyzes the ongoing voice conversation and detects periods of silence of the caller, during which such speech message is injected into the voice conversation.

When a period of silence is detected, the voice message injection module 9 injects the speech message into the same audio channel as the voice conversation so as that the recipient of the second apparatus 1b can hear the former text message created by the caller of the first apparatus 1a.

More in detail the text message is synthesized into the speech message using the database 13 contained by a text-to-speech translation apparatus 11 and speech synthesis software nowadays available on the market.

The recipient of the first apparatus 1a can send the text message to the text-to-speech translation apparatus 11 using a format similar to SMS ("Short Message Service"), or similar to an IM Service ("Instant Messaging Service") format, in particular "WhatsApp", "Google Talk", "Skype", "Viber" and so on. What is important is that, when a certain part of the phrase introduced by the recipient satisfies the need to answer to a question, even if the entire phrase is not yet finished, the recipient can send this text to be converted into a speech with a simple command, such as return or OK. In this case, when the recipient starts again to introduce words, the text-to-speech translation apparatus 11 is ready again to prepare other phrases or part of them to be translated into speech.

The speech recognition and understanding apparatus 15 receives the voice statements from the caller and analyzes phrases formulated by the caller, extracts some words from these phrases and assigns them a meaning related to the usual phrases utilized in a phone conversation.

The speech recognition and understanding apparatus 15 also stores in the database 13 completed phrases useful for example to answer a question posed by the caller, and it extracts and proposes them to the recipient in accordance to the actual question posed by the caller. For doing this, the speech recognition and understanding apparatus 15 analyzes the meaning of the phrase, in particular a question posed by the caller, and looks for a series of answers in the database 13 that may be appropriate to that question. The answers are stored in the database 13 before or during use.

Alternatively, the speech recognition and understanding apparatus 15 stores in the database 13 both questions and answers. In this way, each question is associated with at least one answer that can be proposed to the recipient.

When a recipient sets its first apparatus 1a in the "message mode" as described above, the caller can talk with the recipient, even if he/she doesn't say word. Assuming that the caller asks a question, the latter is analyzed through the speech recognition and understanding apparatus 15 that converts a voice signal of the question into a text format (it performs a speech-to-text translation); then it compares said text format with phrases stored in the database 13. It is important to specify that such comparison is performed as syntactic or semantic way.

If the question in a text format is contained within the database 13, the speech recognition and understanding apparatus 15 recovers at least one predefined answer stored associated with such question and proposes it to the recipient in text format, i.e. it facilitates the recipient in typing the answer.

Thus, the recipient will see the answer in text format on a screen of the first apparatus 1a and he/she can select immediately the answer that he/she prefers, if there are a plurality of answers proposed.

More in detail, for example, a typical phrase/question stored in the database 13 can be "How are you?"; then associated answers can be "I'm fine." or "Very fine, thank you, and you?" or "Not too bad, thanks!" and so on. Another typical question could be "Are you busy?"; then associated answers can be "Yes sorry, call me later" or "No, don't worry, what's up?" and so on. It is clear that a huge amount of questions and answers can be stored in the database 13.

Therefore, the feature just described allows to help a user, in particular the recipient, to respond quickly to a question through a text message without having to entirely type the answer on the first keyboard 4a.

Furthermore, the text-to-speech translation apparatus 11 also works in a "learning mode". Such "learning mode" can be activated by a user, for example by the recipient of the phone call, it provides to recognize the voice of the user when the first apparatus 1a is not in the "message mode", i.e. during a conversation, and it distinguishes, word by word, words that the user is pronouncing.

The text-to-speech translation apparatus 11 also stores the recognized words in an automatic or manual manner. The manual manner provides that the user can validate the storing of the recognized words through his/her apparatus 1a sending an information to the text-to-speech injection apparatus 20 that performs the validation and confirms the storing of the single word, i.e. the vocal acoustic signal of the single word.

Then, when the first apparatus 1a operates in the "message mode", the text-to-speech injection apparatus 20 substitutes the validated and recognized words, i.e. the acoustic speech signal of the word, in the place of the synthesized voice words made on the basis of a predefined male or female voice. The male or female voice is nevertheless used by default. Furthermore, the male or female voice is selectable by the user, for example the recipient, through a menu system of the first apparatus 1a.

The caller of the conversation then can hear the real voice of the recipient and not the predefined male or female voice.

For example, if the recipient of the first apparatus 1a, during a conversation not in "message mode" with the caller of the second apparatus 1b, says the following phrase "Hi Mark, See you later, Bye", the text-to-speech translation apparatus 11 recognizes each single word of that phrase and stores in an automatic o manual manner the acoustic speech signal of each word in the database 13. So, in the database 13, for example, to the word "later" corresponding to the predefined male or female voice is substituted by the acoustic speech signals of the recipient's voice relating to the first apparatus 1a. Each word of the phrase is then recognized and the respective acoustic speech signal is stored in the database 13.

When the recipient sets his/her first apparatus 1a in "message mode" and sends a text message to the caller of the second apparatus 1b, the text-to-speech translation apparatus 11 substitutes, i.e. chooses, the validated and recognized words, i.e. the acoustic speech signal of the word, in the place of the synthesized voice words made on the basis of the predefined male or female voice. The result of the text-to-speech translation is a speech message that comprises acoustic speech signals of the real voice of the recipient. In addition, after a while the voice messages sent to the caller will be made entirely by the acoustic speech of the real voice of the user.

To speed up the sending of a text message, the first apparatus 1a identifies and extracts text words, used for creating the speech message, from the database 13 by considering single letters of a word that a user, for example the recipient, is inputting on the keyboard 4a, and it suggests to the user the complete word before it is completely inputted.

More in detail, the first apparatus 1a identifies text words when a user types a word on the keyboard 4a, then the first apparatus 1a sends at least one letter of said word to the text-to-speech translation apparatus 11 that queries the database 13 for extracting at least a word that contains those letters. For example, if the user begins to type "He", these letters are sent to the text-to-speech translation apparatus 11 that queries the database 13 for extracting at least a word that contains those letters. So, the database 13 returns at least a word from its vocabulary, i.e. "Hello", "Head", "Hence", "Help" and so on. The text-to-speech translation apparatus 11 then returns these words to the first apparatus 1a that will display them on the screen thereof. So, the user can select immediately by the keyboard 4a the word he/she prefers without spending time to type the whole word. This feature is particularly efficient is apparatuses like smart phones having a screen, where it is possible to show on multiple lines, placed one above the others, all the possible words that can satisfy the appropriate message to be sent, so that the user can simply choose the most appropriate one, scrolling them vertically.

Moreover, the text-to-speech translation apparatus 11 provides for storing all past text messages into the database 13, converted into the speech messages, and suggesting entire phrases to the user, for example the recipient, when at least two consecutive words have been already used in said past text messages.

In other words, when the recipient is typing a message using a keyboard 4a, not only words are suggested to the recipient, but also phrases already used by him/her. The suggestion is shown on the screen of the first apparatus 1a.

It is clear that everything has been shown with reference to the first apparatus 1a, can be made also for the second apparatus 1b, in the case both the users of the first and second apparatus 1a,1b desire to start a phone conversation, but both of them don't desire to talk.

Given the duality of the scenario 10, the caller can be the first user of the first apparatus 1a and the recipient can be the second user of the second apparatus 1b and vice versa.

Therefore, the second apparatus 1b can comprise all the elements described for the first apparatus 1a, namely also a text-to-speech injection apparatus and a voice message injection module as described above.

It must be pointed out that the apparatus according to the present invention can be implemented through a computer product which can be loaded into a memory of the first and/or second apparatus 1a,1b and which comprises portions of software code adapted to implement the method by using existing hardware.

It should also be noted that, due to the increasing computing power of microprocessors used nowadays in mobile phones and the progress made by the software related to both text-to-speech translation and speech recognition, all the features of the apparatus above described can be contained in mobile phones as those in common use. A first advantage of the apparatus and method according to the present invention is that it overcomes the drawbacks of the prior art.

A second advantage of the apparatus and method according to the present invention is substituting the voice of the recipient of a phone call, when he/she decides that is inappropriate to talk, with something that is as similar as far as possible to a normal conversation when the recipient of a phone call answers talking with the caller.

A third advantage of the apparatus and method according to the present invention is helping the recipient of a phone call to answer such call without talking, but by inputting data in the apparatus in a very rapid manner.

The apparatus and method for answering a phone call when a recipient of the phone call decides that it is inappropriate to talk, may be subject to many possible variations without departing from the novelty spirit of the inventive idea; it is also clear that in the practical implementation of the invention the illustrated details may have different shapes or be replaced with other technically equivalent elements.

It can therefore be easily understood that the present invention is not limited to a apparatus and method for answering a phone call when a recipient of the phone call decides that it is inappropriate to talk, but may be subject to many modifications, improvements or replacements of equivalent parts and elements without departing from the novelty spirit of the inventive idea, as clearly specified in the following claims.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

The invention claimed is:

1. An apparatus for answering a phone call when a recipient of said phone call decides that it is inappropriate to talk, said apparatus comprising:
    a keyboard configured to:
        send a dedicated command that opens a voice conversation with a caller, which puts said apparatus in a message mode and answers said phone call; and
        type a text message by said recipient of said phone call;
    a microphone configured to be muted upon sending said dedicated command for an entire period during which said apparatus is maintained in said message mode;
    an earphone device configured to listen to said caller;
    a text-to-speech injection apparatus comprising a text-to-speech translation apparatus and a database, the text-to-speech injection apparatus being configured to synthesize said text message into a speech message and transmit said speech message to said caller during said voice conversation; and
    a voice-message injection module configured to send an alert voice message to said caller, said alert voice message saying that said recipient is not talking, but is substituted by said text-to-speech injection apparatus, wherein said voice-message injector module is configured to analyze an ongoing voice conversation and detect periods of silence of said caller, during which periods of silence said speech message is injected into said voice conversation,
    wherein said text-to-speech translation apparatus is configured to recognize a voice of said recipient during a conversation and to distinguish, word by word, words that said recipient is pronouncing; and
    wherein said text-to-speech injection apparatus is adapted to store said recognized words that have been used by said recipient during a conversation, and to substitute said recognized and stored words in the place of the synthesized voice words made on the basis of a predefined male or female voice.

2. The apparatus according to claim 1;
    wherein said apparatus is configured to identify and extract text words from said database by considering single letters of a word that said recipient is inputting on said keyboard, and suggesting to said recipient a complete word before it is completely inputted.

3. The apparatus according to claim 1;
    wherein said text-to-speech injection apparatus further comprises:
        a speech-recognition-and-understanding apparatus configured to analyze questions posed by said caller, to extract some words from said questions, and to assign the extracted words a meaning related to usual phrases utilized in a phone conversation.

4. The apparatus according to claim 3;
    wherein said speech-recognition-and-understanding apparatus is configured to store completed phrases to answer said questions posed by said caller in said database, and to extract and propose the completed phrases to said recipient in accordance to an actual question posed by said caller and analyzed by said speech-recognition-and-understanding apparatus.

5. The apparatus according to claim 3;
    wherein said speech-recognition-and-understanding apparatus stores in said database both questions and answers, each stored question being associated with at least one answer.

6. The apparatus according to claim 1;
    wherein said text-to-speech translation apparatus is configured to store all past text messages into said database, converted into said speech messages, and to suggest entire phrases to said recipient when at least two consecutive words have been already used in said past text messages.

7. The apparatus according to claim 1;
wherein said text-to-speech translation apparatus is configured to synthesize said speech message on the basis of said predefined male or female voice, selectable by a user through a menu system of said apparatus.

8. A method for answering a phone call through an apparatus when a recipient of said phone call decides that it is inappropriate to talk, said method comprising the following steps:
sending a dedicated command though a keyboard to:
open a voice conversation with a caller, thereby putting said apparatus in a message mode and answering said phone call; and
mute signals coming from a microphone of said apparatus for an entire period during which said apparatus is maintained in said message mode;
listening to said caller through an earphone device;
sending, through a voice-message injection module, an alert voice message to said caller, said alert voice message saying that said recipient is not talking, but is substituted by a text-to-speech injection apparatus;
utilizing the keyboard, by said recipient, to write a text message in reply to a question posed by said caller;
synthesizing said text message into a speech message through a text-to-speech translation apparatus using a database;
transmitting said speech message to said caller during said voice conversation through said text-to-speech injection apparatus;
analyzing an ongoing voice conversation and detecting periods of silence of said caller; and
injecting said speech message into said voice conversation through said voice message injector module during one of the detected periods of silence;
further comprising the steps of:
recognizing, through said text-to-speech translation apparatus, a voice of said recipient during a conversation and distinguishing, word by word, words that said recipient is pronouncing;
storing, through said text-to-speech injection apparatus, said recognized words that have been used by said recipient during a conversation which did not occur in said message mode; and
substituting said recognized and stored words in said text-to-speech injection apparatus in the place of synthesized voice words made on the basis of a predefined male or female voice.

9. The method according to claim 8;
wherein the step of storing words is validated by a user of said apparatus.

10. The method according to claim 8;
wherein said step of recognizing a voice of said recipient when said apparatus is not in said message mode is activated by said user.

11. The method according to claim 8, further comprising the step of:
analyzing questions posed by said caller through a speech-recognition-and-understanding apparatus that extracts some words from said questions and assigns them a meaning related to the usual phrases utilized in a phone conversation.

12. The method according to claim 11, further comprising the step of:
storing in said database, through said speech-recognition-and-understanding apparatus, both questions and answers, wherein each question is associated with at least one answer.

13. The method according to claim 11, further comprising the step of:
storing completed phrases to answer said questions posed by said caller in said database; and
extracting and proposing the stored completed phrases to said recipient in accordance to an actual question posed by said caller and analyzed by said speech recognition and understanding apparatus.

14. The method according to claim 8, further comprising the step of:
identifying and extracting text words, used for creating said speech message, from said database by considering single letters of a word that said recipient is inputting; and
suggesting to said recipient a complete word before it is completely inputted.

15. The method according to claim 8, further comprising the step of:
storing all past text messages, converted into said speech messages, into said database through said text-to-speech translation apparatus; and
suggesting entire phrases to said recipient when at least two consecutive words have been already used in said past text messages.

16. The method according to claim 8, further comprising the step of:
synthesizing said speech message on the basis of said predefined male or female voice, selectable by said user through a menu system of said apparatus.

17. The method according to claim 8;
wherein said text message uses a format of a Short Messaging Service ("SMS") or an Instant Messaging Service ("IM") Service message.

* * * * *